H. H. HILLMAN.
REFRIGERATOR.
APPLICATION FILED JULY 12, 1920.

1,362,101.

Patented Dec. 14, 1920.

Inventor:
Herbert H. Hillman
By Cyrus W. Rice
his Attorney.

UNITED STATES PATENT OFFICE.

HERBERT H. HILLMAN, OF GRAND HAVEN, MICHIGAN, ASSIGNOR TO CHALLENGE REFRIGERATOR COMPANY, OF GRAND HAVEN, MICHIGAN, A CORPORATION OF MICHIGAN.

REFRIGERATOR.

1,362,101.  Specification of Letters Patent.  Patented Dec. 14, 1920.

Application filed July 12, 1920. Serial No. 395,689.

*To all whom it may concern:*

Be it known that I, HERBERT H. HILLMAN, a citizen of the United States, residing at Grand Haven, in the county of Ottawa and State of Michigan, have invented new and useful Improvements in Refrigerators, of which the following is a specification.

The present invention relates to structures (such as refrigerators) having chambers, with a partition between them having an opening therethrough; and its object is, generally, to provide improved linings for such chambers and an improved hollow connecting member for the linings extending through the partition's opening and through suitable openings through the linings; and more particularly, to provide such a connecting member which shall hold the portions of the linings adjacent the partition's opening securely in place; and further, to provide such linings and connecting member so formed and assembled that the same may present at their meeting points a substantially flat or plane wall for each chamber, thus providing a lining for the structure which shall be sanitary and readily kept clean; and further, to provide such linings and connecting member which shall be readily assembled.

These and any other objects hereinafter appearing are attained by, and the invention finds preferable embodiment in, the structure hereinafter particularly described and illustrated by the accompanying drawings, in which:—

Figure 1:
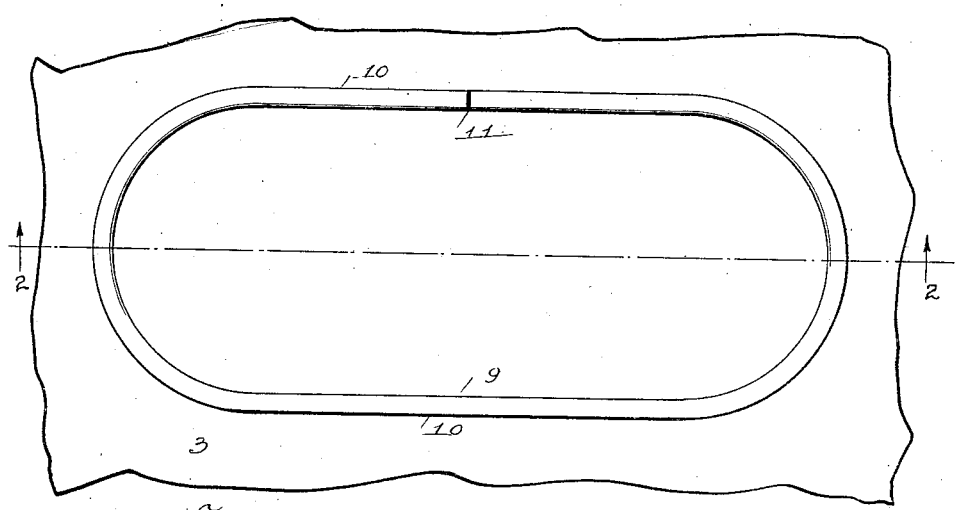
Figure 1 is a view of a portion of a structure of the character referred to above, as a refrigerator.
Figure 2:
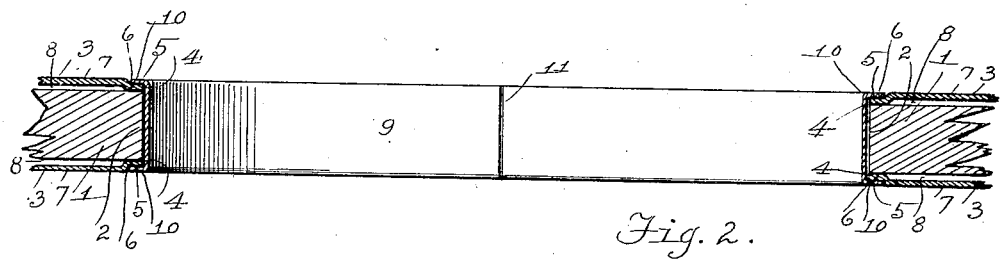
Fig. 2 is a sectional view of said portion taken on a line corresponding to line 2—2 of Fig. 1.
Figure 3:
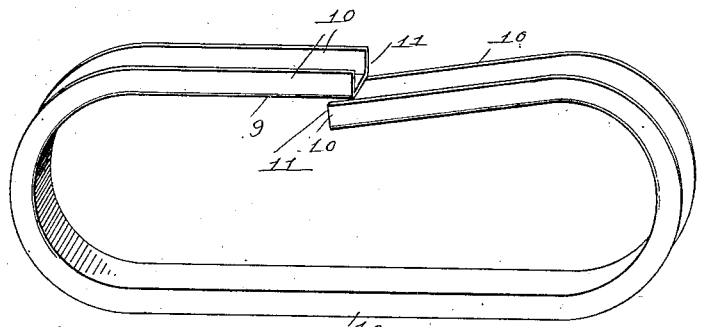
Fig. 3 is a view in perspective of a connecting member for the linings of such a structure, showing said member compressed or sprung diametrically for assembling the same with the structure's linings.

Refrigerators and the like usually have a plurality of chambers with air passages through the partitions which separate such chambers. In the views, such a partition 1, has the opening 2 therethrough for air circulation. The chambers on opposite sides of this partition are provided with linings 3 of suitable material, such as the metallic "porcelained" sheets commonly employed for lining refrigerators. These linings have openings 4 therethrough registering with the partition's opening, and annular recesses 5 surrounding their said openings. To form these recesses, the annular portions 6 of the linings, (which portions surround their openings) are offset inwardly from the lining's body portion 7, as particularly shown in Fig. 2. It will be seen that by this method of forming the recesses air chambers 8 are provided between the body portions 7 of the linings and the partition, thus increasing the thermo insulation of the structure. The hollow connecting member 9 for the linings (which may be formed of like material with the linings) extends through their openings and the partition's opening, and has at its ends outwardly extending flanges 10 seated in the linings' recesses respectively. That the parts may be readily assembled, this connecting member is diametrically compressible, being split longitudinally at 11, so that it may be sprung as shown in Fig. 3 to permit its insertion into the openings. It will be seen that in the assembled position of the parts, the flanges 10 of the connecting member assist in holding the linings against movement in any direction; and especially, that these flanges hold the annular portions 6 of the linings in contact with the partition. It will also be seen that the inner surfaces of the chambers' walls extend substantially flat, or in a plane, at the meeting points of the linings and the flanges 10 of the connecting member, there being no corners or projecting points in the inner surfaces of the chambers.

The invention being intended to be pointed out in the claims, is not to be limited to or by details of construction of the particular embodiment thereof illustrated by the drawings or hereinbefore described.

I claim:

1. In a structure of the character described having chambers with a partition between them having an opening therethrough; linings for said chambers having openings therethrough registering with the partition's opening and annular recesses surrounding the linings' openings; a diametrically compressible hollow connecting member for the linings extending through all said openings and having at its ends outwardly extending flanges adapted to be seated in the linings' recesses respectively.

2. In a structure of the character described having chambers with a partition between them having an opening therethrough; linings for said chambers, each lining having an opening therethrough registering with the partition's opening, and each lining having a body portion and an annular portion surrounding its opening and offset inwardly from said body portion whereby said body portion is spaced from the partition; a longitudinally-split hollow connecting member for the linings extending through all said openings and having at its ends outwardly extending flanges adapted to be seated in the linings' said annular portions respectively.

3. In a structure of the character described having chambers with a partition between them having an opening therethrough; linings for said chambers, each lining having an opening therethrough registering with the partition's opening, and each lining having a body portion and an annular portion surrounding its opening and offset inwardly from said body portion whereby said body portion is spaced from the partition; a longitudinally-split hollow connecting member for the linings extending through all said openings and having at its ends outwardly extending flanges adapted to be seated in the linings' said annular portions respectively and in such seated position being adapted to hold said annular portions in contact with the partition.

4. In a structure of the character described having chambers with a partition between them having an opening therethrough; linings for said chambers, each lining having an opening therethrough registering with the partition's opening, and each lining having an annular portion surrounding its opening provided with a recess, each lining having also a body portion spaced from the partition by its said annular portion to form an air chamber between said body portion and the partition; a hollow connecting member for the linings extending through all said openings and having at its ends flanges adapted to be seated in the linings' recesses respectively.

In testimony whereof I have hereunto set my hand at Grand Rapids, Michigan, this 3rd day of July, 1920.

HERBERT H. HILLMAN.